United States Patent
Roulund

(10) Patent No.: US 10,053,174 B1
(45) Date of Patent: Aug. 21, 2018

(54) SEAT BACK SUPPORT ASSEMBLY FOR ADJUSTABLY SUPPORTING A SEAT BACK OF A VEHICLE

(71) Applicant: High End Seating Solutions LLC, Santa Ana, CA (US)

(72) Inventor: Lars Roulund, Laguna Niguel, CA (US)

(73) Assignee: High End Seating Solutions LLC, Santa Ana, CA (US)

( * ) Notice: Subject to any disclaimer, the term of this patent is extended or adjusted under 35 U.S.C. 154(b) by 0 days.

(21) Appl. No.: 15/961,076

(22) Filed: Apr. 24, 2018

Related U.S. Application Data

(63) Continuation of application No. 15/146,209, filed on May 4, 2016, now Pat. No. 9,957,010.

(60) Provisional application No. 62/305,239, filed on Mar. 8, 2016.

(51) Int. Cl.
  *B62J 1/02* (2006.01)
  *B62J 1/28* (2006.01)
  *A47C 7/48* (2006.01)
  *A47C 7/40* (2006.01)
  *A47C 7/42* (2006.01)

(52) U.S. Cl.
  CPC ........ *B62J 1/28* (2013.01); *A47C 7/40* (2013.01); *A47C 7/402* (2013.01); *A47C 7/42* (2013.01); *A47C 7/48* (2013.01)

(58) Field of Classification Search
  CPC ...... B62J 1/28; B62J 7/08; A47C 7/42; A47C 7/40; A47C 7/402; A47C 7/46; B60N 2/20; B60N 2/22; B60N 2/4242; B60N 2/427; B60N 2/3065; B60N 2/16; B60N 2/42709; B64D 11/0696; B64D 11/064; B64D 25/04; B64D 11/0619; B64D 11/0649
  USPC .... 297/354.1, 452.19, 216.1, 357, 352, 376, 297/215.14, 215.11, 215.13, 358
  See application file for complete search history.

(56) References Cited

U.S. PATENT DOCUMENTS

| | | |
|---|---|---|
| 3,822,917 A | 7/1974 | George |
| 4,953,911 A | 9/1990 | Hanagan |
| 5,026,119 A | 6/1991 | Frank et al. |
| 5,544,937 A | 8/1996 | Hanagan |
| 5,667,232 A | 9/1997 | Gogan |
| 5,997,088 A | 12/1999 | Stark et al. |
| 6,007,150 A | 12/1999 | Clerkin et al. |
| 6,224,081 B1 | 5/2001 | Wayman et al. |
| 6,347,804 B1 | 2/2002 | Seibel |

(Continued)

*Primary Examiner* — Chi Q Nguyen
(74) *Attorney, Agent, or Firm* — Roeder & Broder LLP; James P. Broder

(57) ABSTRACT

A method for adjustably supporting a seat back of a vehicle includes securing a vehicle engaging member to the vehicle body, the vehicle engaging member including a supporting section; and adjustably coupling a seat back receiving member to the vehicle engaging member, the seat back receiving member including (i) a base that is adjustably coupled to the supporting section, the base being alternatively positioned in a first vertical position and a second vertical position relative to the supporting section; and (ii) a receiver that is coupled to the base, the receiver being configured to receive the seat back. When the base is in the first vertical position, the seat back is at a first height relative to the vehicle seat. Additionally, when the base is in the second vertical position, the seat back is at a second height relative to the vehicle seat that is different than the first height.

20 Claims, 6 Drawing Sheets

(56) References Cited

U.S. PATENT DOCUMENTS

| | | | |
|---|---|---|---|
| 6,659,547 B2 | 12/2003 | Petersen | |
| 7,077,470 B1 | 7/2006 | Strother | |
| 8,371,652 B2 | 2/2013 | Revell | |
| 8,500,195 B2 | 8/2013 | Smith, II | |
| 9,381,840 B2 | 7/2016 | Tobata | |
| 9,493,095 B2 | 11/2016 | Koike | |
| 9,957,010 B2 * | 5/2018 | Roulund | B62J 1/28 |
| 2003/0025290 A1 | 2/2003 | McCann | |
| 2006/0290179 A1 | 12/2006 | Reinhard | |
| 2013/0328364 A1 * | 12/2013 | Cecinas | B60N 2/20 297/216.1 |
| 2015/0137571 A1 * | 5/2015 | Koike | B60N 2/643 297/340 |
| 2015/0165949 A1 | 6/2015 | Tobata | |
| 2017/0259866 A1 | 9/2017 | Roulund | |

* cited by examiner

SEAT BACK SUPPORT ASSEMBLY FOR ADJUSTABLY SUPPORTING A SEAT BACK OF A VEHICLE

RELATED APPLICATION

The present application is a continuation application that claims benefit under 35 U.S.C. 120 on co-pending U.S. application Ser. No. 15/146,209, filed on May 4, 2016 and entitled "SEAT BACK SUPPORT ASSEMBLY FOR ADJUSTABLY SUPPORTING A SEAT BACK OF A VEHICLE". Additionally, U.S. application Ser. No. 15/146,209 claims priority on U.S. Provisional Application Ser. No. 62/305,239, filed on Mar. 8, 2016 and entitled "SEAT BACK SUPPORT ASSEMBLY FOR ADJUSTABLY SUPPORTING A SEAT BACK OF A VEHICLE". As far as permitted, the contents of U.S. application Ser. No. 15/146,209, now U.S. Pat. No. 9,957,010, and U.S. Provisional Application Ser. No. 62/305,239 are incorporated herein by reference.

BACKGROUND

Riders on a vehicle, such as a motorcycle, can often be seated on a vehicle seat of the vehicle for long periods of time during a ride. Thus, it is desired to provide the rider with improved comfort over the course of a long ride. However, with riders being of various shapes and sizes, what is comfortable for one rider may not be comfortable for another rider. Accordingly, it can be desired to provide adjustability in any seating situation for the riders of the vehicle. Further, some riders desire to have a seat back, while others do not. Oftentimes it is difficult to determine whether to include a seat back during a user's initial purchase. Still further, the desired position of a seat back, when used, can also vary from rider to rider.

SUMMARY

The present invention is directed toward a method for adjustably supporting a seat back of a vehicle, the vehicle including a vehicle body and a vehicle seat. In various embodiments, the method includes securing a vehicle engaging member to the vehicle body, the vehicle engaging member including a supporting section; and adjustably coupling a seat back receiving member to the vehicle engaging member, the seat back receiving member including (i) a base that is adjustably coupled to the supporting section of the vehicle engaging member, the base being alternatively positioned in a first vertical position and a second vertical position relative to the supporting section, the second vertical position being different than the first vertical position; and (ii) a receiver that is coupled to the base, the receiver being configured to receive the seat back. In such embodiments, when the base is in the first vertical position, the seat back is at a first height relative to the vehicle seat. Additionally, when the base is in the second vertical position, the seat back is at a second height relative to the vehicle seat that is different than the first height.

In some embodiments, the method further includes alternatively coupling a first vertical support member to the vehicle engaging member substantially between the base and the supporting section so that the base is alternatively positioned in the first vertical position relative to the supporting section, the first vertical support member having a first thickness, the first vertical support member supporting the seat back receiving member so that the seat back is positioned at the first height relative to the vehicle seat. In such embodiments, when the base is alternatively positioned in the second vertical position relative to the supporting section, the method includes substantially directly coupling the base to the supporting section so that the seat back is positioned at the second height relative to the vehicle seat.

Additionally, in certain embodiments, adjustably coupling includes the base being alternatively positioned in a third vertical position relative to the supporting section, the third vertical position being different than the first vertical position and the second vertical position. In such embodiments, when the base is in the third vertical position, the seat back is at a third height relative to the vehicle seat that is different than the first height and the second height. Further, in some such embodiments, the method can further include (i) alternatively coupling a first vertical support member to the vehicle engaging member substantially between the base and the supporting section so that the base is alternatively positioned in the first vertical position relative to the supporting section, the first vertical support member having a first thickness, the first vertical support member supporting the seat back receiving member so that the seat back is positioned at the first height relative to the vehicle seat; and (ii) alternatively coupling a second vertical support member to the vehicle engaging member substantially between the base and the supporting section so that the base is alternatively positioned in the second vertical position relative to the supporting section, the second vertical support member having a second thickness that is different than the first thickness, the second vertical support member supporting the seat back receiving member so that the seat back is positioned at the second height relative to the vehicle seat. In such embodiments, when the base is alternatively positioned in the third vertical position relative to the supporting section, the method includes substantially directly coupling the base to the supporting section so that the seat back is positioned at the third height relative to the vehicle seat.

In some embodiments, adjustably coupling further includes the base being alternatively positioned in a first horizontal position and a second horizontal position relative to the supporting section, the second horizontal position being different than the first horizontal position. In such embodiments, when the base is in the first horizontal position, the seat back is in a first position relative to the vehicle seat; and when the base is in the second horizontal position, the seat back is in a second position relative to the vehicle seat that is different than the first position.

Additionally, in certain such embodiments, securing includes the supporting section having a support aperture; adjustably coupling includes the base having a base aperture; and adjustably coupling further includes extending a base fastener through the support aperture and the base aperture to adjustably couple the base to the support section, at least one of the support aperture and the base aperture being substantially slot-shaped.

Further, in other embodiments, securing includes the supporting section having a plurality of support apertures; adjustably coupling includes the base having a plurality of base apertures; and adjustably coupling further includes extending each of a plurality of base fasteners through one of the plurality of support apertures and one of the plurality of base apertures to adjustably couple the base to the support section, each of the plurality of support apertures being substantially slot-shaped.

Additionally, in some embodiments, adjustably coupling can further include the base being alternatively positioned in a third horizontal position relative to the supporting section, the third horizontal position being different than the first horizontal position and the second horizontal position. In such embodiments, when the base is in the third horizontal position, the seat back is in a third position relative to the vehicle seat that is different than the first position and the second position.

In certain embodiments, adjustably coupling includes movably coupling a receiver of the seat back receiving member to the base, the receiver including a receiver aperture that is configured to receive a portion of the seat back; and selectively adjusting an angle of the receiver aperture relative to the base to selectively adjust a seat back angle of the seat back relative to the vehicle seat. In such embodiments, movably coupling the receiver can include biasing an angular position of the receiver with a resilient member of the seat back receiving member so as to maintain the seat back angle of the seat back relative to the vehicle seat.

Further, in some embodiments, securing includes alternatively securing the vehicle engaging member to the vehicle body in multiple locations.

Additionally, in other applications, the present invention is further directed toward a method for adjustably supporting a seat back of a vehicle, the vehicle including a vehicle body and a vehicle seat, the method including securing a vehicle engaging member to the vehicle body, the vehicle engaging member including a supporting section; and adjustably coupling a seat back receiving member to the vehicle engaging member, the seat back receiving member including a base that is adjustably coupled to the supporting section of the vehicle engaging member, the base being alternatively positioned in a first horizontal position and a second horizontal position relative to the supporting section, the second horizontal position being different than the first horizontal position; wherein when the base is in the first horizontal position, the seat back is in a first position relative to the vehicle seat; and wherein when the base is in the second horizontal position, the seat back is in a second position relative to the vehicle seat that is different than the first position.

Further, in still other applications, the present invention is directed toward a method for adjustably supporting a seat back of a vehicle, the vehicle including a vehicle body and a vehicle seat, the method including (A) securing a vehicle engaging member to the vehicle body, the vehicle engaging member including a supporting section having a support aperture; (B) adjustably coupling a seat back receiving member to the vehicle engaging member, the seat back receiving member including (i) a base that is adjustably coupled to the supporting section of the vehicle engaging member, the base including a base aperture, and (ii) a receiver that is movably coupled to the base, the receiver including a receiver aperture that is configured to receive a portion of the seat back; (C) selectively adjusting an angle of the receiver aperture relative to the base to selectively adjust a seat back angle of the seat back relative to the vehicle seat; (D) alternatively coupling a first vertical support member to the vehicle engaging member substantially between the base and the supporting section so that the base is alternatively positioned in a first vertical position and a second vertical position relative to the supporting section, the second vertical position being different than the first vertical position, the first vertical support member having a first thickness; and (E) extending a base fastener through the support aperture and the base aperture to adjustably couple the base to the support section so that the base is alternatively positioned in a first horizontal position and a second horizontal position relative to the supporting section, the second horizontal position being different than the first horizontal position, at least one of the support aperture and the base aperture being substantially slot-shaped; wherein when the first vertical support member is positioned substantially between the base and the supporting section, the first vertical support member supports the seat back receiving member so that the base is positioned in the first vertical position and the seat back is positioned at a first height relative to the vehicle seat; wherein when the first vertical support member is not positioned between the base and the supporting section, the base is substantially directly coupled to the supporting section so that the base is in the second vertical position and the seat back is at a second height relative to the vehicle seat that is different than the first height; wherein when the base is in the first horizontal position, the seat back is in a first position relative to the vehicle seat; and wherein when the base is in the second horizontal position, the seat back is in a second position relative to the vehicle seat that is different than the first position.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Embodiments of the present invention are described herein in the context of a seat back support assembly that adjustably supports a seat back of a vehicle relative to a vehicle seat. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same or similar nomenclature and/or reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application-related and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1A:
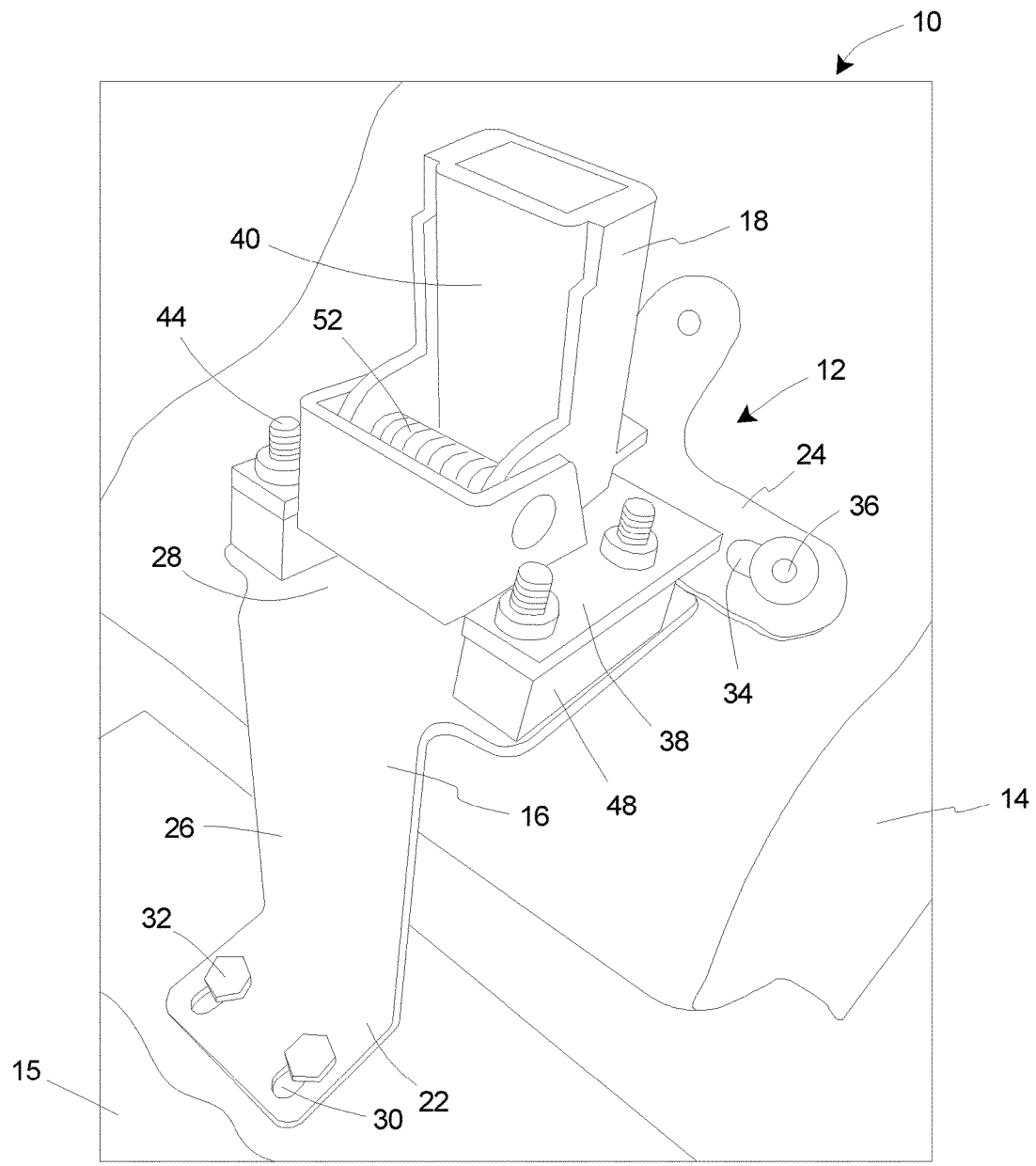
FIG. 1A is a perspective view of a portion of a vehicle and an embodiment of a seat back support assembly having features of the present invention that is coupled to the vehicle.

FIG. 1A is a perspective view of a portion of a vehicle 10, e.g., a motorcycle or any other suitable type of vehicle, and an embodiment of a seat back support assembly 12 (also sometimes referred to herein simply as a "support assembly") having features of the present invention that is coupled to the vehicle 10.

In certain embodiments, the vehicle 10 includes a vehicle body 14 and a vehicle seat 15 (only a portion of which is shown for purposes of clarity) that is coupled to and/or is formed as a part of the vehicle body 14.

The design of the support assembly 12 can be varied to suit the specific requirements of the vehicle 10 and/or to meet the needs and desires of the rider or user of the vehicle 10. In the embodiment illustrated in FIG. 1A, the support assembly 12 includes a vehicle engaging member 16 and a seat back receiving member 18. Alternatively, the support assembly 12 can include more components or fewer components than those specific illustrated in FIG. 1A.

As an overview, the support assembly 12 is configured to adjustably support a seat back 20 (illustrated in FIG. 1B) relative to the vehicle seat 15 to more comfortably support a rider of the vehicle 10. More specifically, in various embodiments, the support assembly 12 is configured to receive the seat back 20 so that the seat back 20 is alternatively positioned in multiple positions relative to the vehicle seat 15. For example, in some embodiments, the support assembly 12 can adjustably support the seat back 20 in multiple, alternative vertical (height) positions relative to the vehicle seat 15. In such embodiments, the seat back receiving member 18 can be positioned in alternative vertical (height) positions relative to the vehicle engaging member 16 in order that the seat back 20 can be alternatively positioned in multiple vertical (height) positions relative to the vehicle seat 15. Additionally and/or alternatively, in certain embodiments, the support assembly 12 can adjustably support the seat back 20 in multiple alternative horizontal positions (i.e. forward toward a front of the vehicle and backward toward a rear of the vehicle) relative to the vehicle seat 15. In such embodiments, the seat back receiving member 18 can be positioned in alternative horizontal (fore and aft) positions relative to the vehicle engaging member 16 in order that the seat back 20 can be alternatively positioned in multiple horizontal positions relative to the vehicle seat 15.

Additionally, in some embodiments, the support assembly 12 can also adjustably support the seat back 20 such that the angular position of the seat back 20 relative to the vehicle seat 15 can be selectively adjusted.

It should be appreciated that the support assembly 12 can be an after-market product that can be optionally secured to and used with the vehicle 10 after the vehicle 10 has been purchased, leased or otherwise acquired by the rider. Alternatively, the support assembly 12 can be factory-installed during the original manufacturing of the vehicle 10. In addition, the support assembly 12 can be used for a sole rider of a single-rider vehicle 10, a primary rider (such as the driver) of a multiple-rider vehicle 10, and/or one or more passengers of a multiple-rider vehicle 10.

The vehicle engaging member 16 is configured to engage the vehicle 10 such that the vehicle engaging member 16 can be secured to the vehicle body 14. Additionally, as described herein, the vehicle engaging member 16 is also configured to support the seat back receiving member 18. In certain embodiments, the vehicle engaging member 16 can be integrally formed as a single unitary structure that is then molded and formed as desired such that the vehicle engaging member 16 can be securely fastened to the vehicle body 14 in multiple locations. Alternatively, the vehicle engaging member 16 can be comprised of multiple components that are attached to one another.

Additionally, the vehicle engaging member 16 can be formed from any suitable materials. For example, the vehicle engaging member 16 can be formed from iron, steel, carbon fiber, or any other suitably strong and rigid materials.

The design of the vehicle engaging member 16 can be varied to suit the requirements of the support assembly 12. As shown in this embodiment, the vehicle engaging member 16 includes a first (front) coupling section 22, a second (rear) coupling section 24, a transitional section 26, and a supporting section 28. Alternatively, the vehicle engaging member 16 can include more components or fewer components than what is illustrated and described herein. As shown, the general overall shape and contour of the vehicle engaging member 16 is configured so as to generally follow the overall shape and contour of a portion of the vehicle body 14. The vehicle engaging member 16 will be further illustrated and described herein below in relation to FIGS. 2A and 2B.

As shown in the embodiment illustrated in FIG. 1A, the first coupling section 22 includes a pair of first coupling apertures 30, e.g., slots in this embodiment, that are each configured to receive a first fastener 32, e.g., a screw or bolt, to secure the vehicle engaging member 16 to the vehicle body 14. Somewhat similarly, the second coupling section 24 includes a pair of second coupling apertures 34 (only one is shown in FIG. 1A), e.g., slots in this embodiment, that are each configured to receive a second fastener 36 (only one is shown in FIG. 1A), e.g., a screw or bolt, to also secure the vehicle engaging member 16 to the vehicle body 14. As shown, the first coupling section 22 is secured to the vehicle body 14 toward (closer to) a vehicle front (not shown) relative to the second coupling section 24; and the second coupling section 24 is secured to the vehicle body 14 toward (closer to) a vehicle back (not shown) relative to the first coupling section 22.

Although only a small portion of the vehicle seat 15 is shown in FIG. 1A for purposes of clarity, it should be appreciated that the vehicle engaging member 16 can be positioned and secured to the vehicle body 14 primarily underneath the vehicle seat 15 to enable the desired coupling of the seat back 20 to the vehicle seat 15.

Additionally, it should be appreciated that the use of the terms "first coupling section" and "second coupling section", "first coupling apertures" and "second coupling apertures", and "first fastener" and "second fastener" is merely for convenience and ease of illustration. Thus, either of the coupling sections 22, 24 can be referred to as the "first coupling section" and/or the "second coupling section", either of the pairs of coupling apertures 30, 34 can be referred to as the "first coupling apertures" and/or the "second coupling apertures", and either of the fasteners 32, 36 can be referred to as the "first fastener" and/or the "second fastener".

The transitional section 26 extends in a substantially vertical direction between the first coupling section 22 and the supporting section 28.

The supporting section 28 is configured to adjustably support the seat back receiving member 18 such that the seat back 20 can be adjustably positioned relative to the vehicle seat 15. As shown, the supporting section 28 extends in a substantially horizontal direction between the transitional section 26 and the second coupling section 24.

The seat back receiving member 18 is configured to adjustably and/or removably receive the seat back 20 so that the seat back 20 can be in various alternative positions relative to the vehicle seat 15. For example, as noted above, the position of the seat back receiving member 18 can be adjusted vertically and/or horizontally relative to the vehicle engaging member 16 so as to effectively adjust the position of the seat back 20 relative to the vehicle seat 15. Of note, the vertical and/or horizontal position of the seat back 20 relative to the vehicle seat 15 is selectively adjustable by adjusting the position of the seat back receiving member 18 relative to the vehicle engaging member 16. Such adjustment does not require any adjustment of the direct coupling between the seat back 20 and the seat back support assembly 12.

The design of the seat back receiving member 18 can be varied to suit the requirements of the support assembly 12. As illustrated in this embodiment, the seat back receiving member 18 includes a base 38 and a post receiving member 40 (also sometimes referred to herein as a "post receiver" or simply a "receiver") that is movably coupled to the base 38. Additionally and/or alternatively, the seat back receiving member 18 can include more components than those illustrated and described in relation to FIG. 1A.

The base 38 is coupled to the supporting section 28 of the vehicle engaging member 16. In order to enable such coupling between the base 38 and the supporting section 28, the base 38 can include a plurality of base apertures 342 (illustrated in FIG. 3) that are each configured to receive a base fastener 44, e.g., a screw or a bolt. Each of the base fasteners 44 can be configured to extend through one of the base apertures 342 as well as through a support aperture 246 (illustrated, for example, in FIG. 2B), e.g., a slot, formed in the supporting section 28 of the vehicle engaging member 16.

Additionally, as provided herein, the vertical position (or height) of the base 38 can be adjusted relative to the supporting section 28 by the presence (or absence) of a vertical support member 48 that can be positioned substantially directly between the base 38 and the supporting section 28.

The post receiver 40 is configured to receive a portion of the seat back 20. In particular, in certain embodiments such as illustrated herein, the post receiver 40 is sized and shaped to receive a support post 50 (illustrated in FIG. 1B) of the seat back 20.

Additionally, the post receiver 40 is movably coupled to the base 38. More specifically, in certain embodiments, an angular position of the post receiver 40 relative to the base 38 can be selectively adjusted. As shown, the seat back receiving member 18 can further include a resilient member 52, e.g., a spring, that biases the position of the post receiver 40 so as to help to maintain the post receiver 40 in the desired angular position relative to the base 38.

The seat back receiving member 18 can be formed from any suitable materials. For example, the seat back receiving member 18 can be formed from iron, steel, carbon fiber, or any other suitably strong and rigid materials.

Figure 1B:
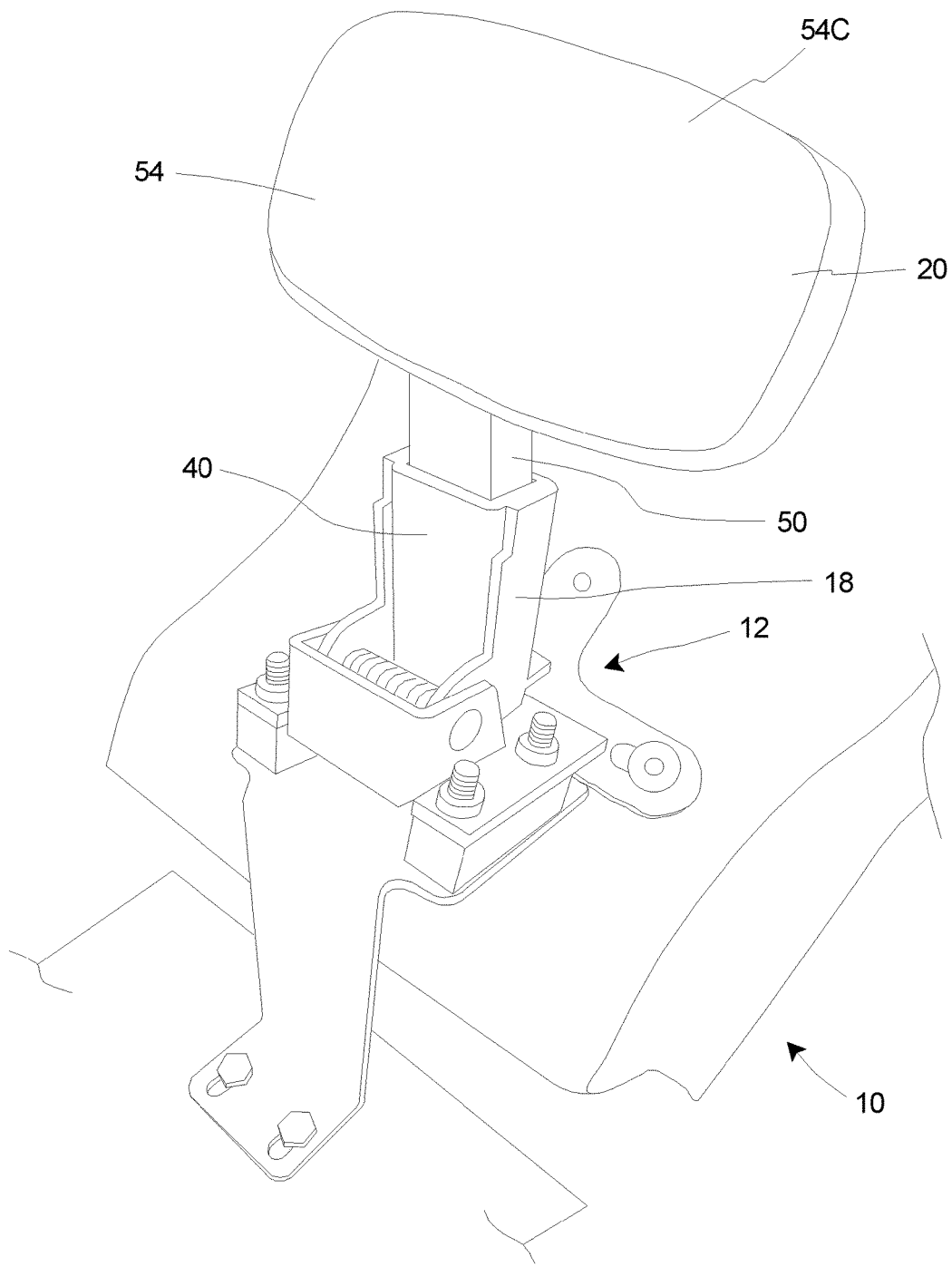
FIG. 1B is a perspective view of the vehicle and the seat back support assembly illustrated in FIG. 1A, and a seat back that is coupled to the vehicle via the seat back support assembly.

FIG. 1B is a perspective view of the vehicle 10 and the seat back support assembly 12 illustrated in FIG. 1A. Also illustrated in FIG. 1B is the seat back 20 that is coupled to the vehicle 10 via the seat back support assembly 12.

The design of the seat back 20 can be varied to suit the requirements of the vehicle 10 and/or to suit the desired comfort of the rider. As shown, the seat back 20 includes the support post 50 and a back cushion assembly 54 that is coupled to the support post 50.

The support post 50 is configured to be selectively coupled to the post receiving member 40 so as to effectively couple the seat back 20 to the seat back receiving member 18. More specifically, in this embodiment, the support post 50 is sized and shaped to fit snugly within the post receiving member 40 of the seat back receiving member 18.

As noted above, in various embodiments, the vertical and horizontal adjustability of the seat back 20 relative to the vehicle seat 15 (illustrated in FIG. 1A) can be accomplished without requiring any adjustment of the direct coupling between the seat back 20 and the seat back support assembly 12. Thus, in certain embodiments, the support post 50 need only and can only be coupled to the post receiver 40 in a single position. Alternatively, in other embodiments, the support post 50 of the seat back 20 can be coupled to the post receiver 40 in multiple alternative positions. With such alternative design, the vertical position of the seat back 20 relative to the vehicle seat 15 can be further adjusted.

The back cushion assembly 54 can have any suitable design. For example, the back cushion assembly 54 can include a back base 554A (illustrated in FIG. 5), a back cushion (not shown) and a back cover 54C that covers the back cushion and secures the back cushion to the back base. Alternatively, the back cushion assembly 54 can have another suitable design.

Figure 2A:
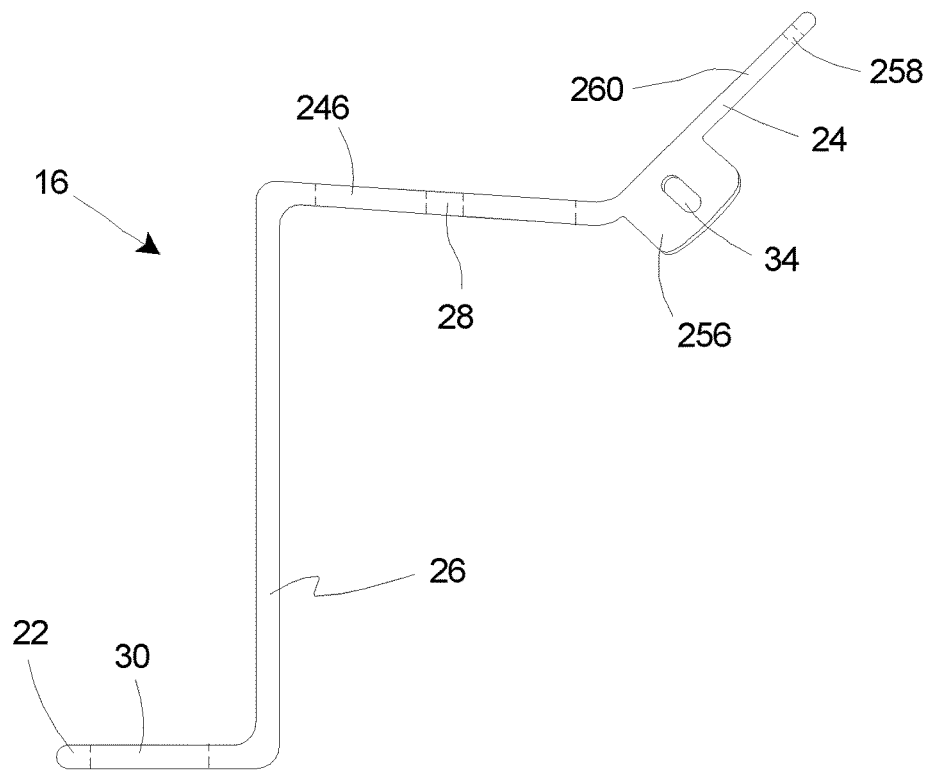
FIG. 2A is a side view of an embodiment of a vehicle engaging member that forms a portion of the seat back support assembly illustrated in FIG. 1A.
Figure 2B:
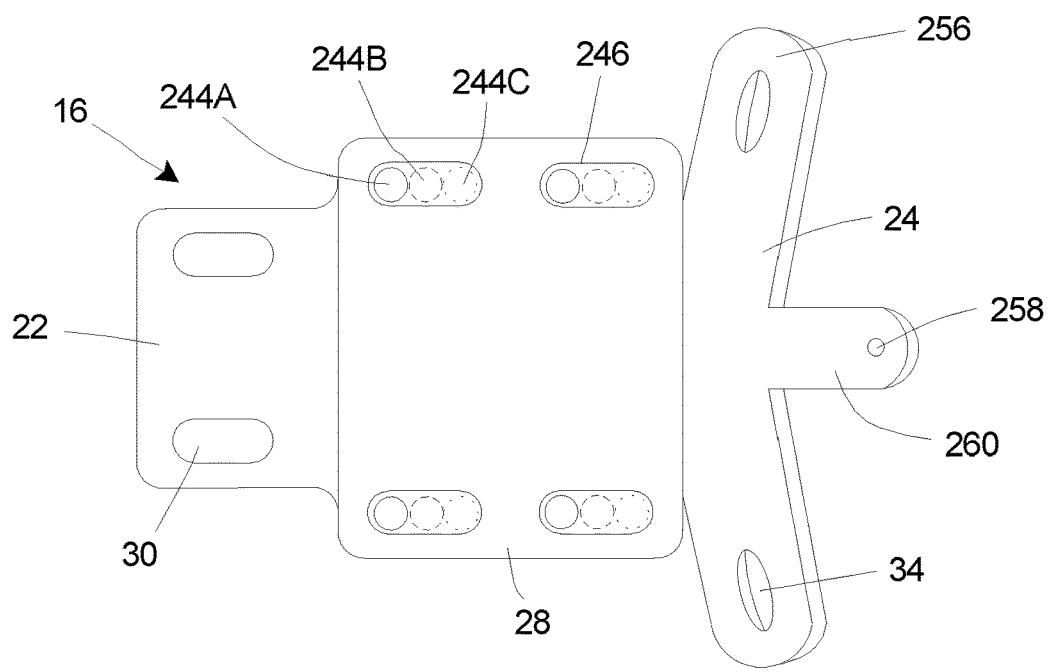
FIG. 2B is a top view of the vehicle engaging member illustrated in FIG. 2A.

FIG. 2A is a side view of an embodiment of the vehicle engaging member 16 that forms a portion of the seat back support assembly 12 illustrated in FIG. 1A. Additionally, FIG. 2B is a top view of the vehicle engaging member 16 illustrated in FIG. 2A. As provided above, in this embodiment, the vehicle engaging member 16 includes the first (front) coupling section 22, the second (rear) coupling section 24, the transitional section 26, and the supporting section 28.

As noted, the first coupling section 22 includes the pair of first coupling apertures 30 that are configured to receive the first fasteners 32 (illustrated in FIG. 1A) to provide a portion of the coupling between the vehicle engaging member 16 and the vehicle body 14 (illustrated in FIG. 1A). In certain embodiments, as shown, the first coupling apertures 30 can comprise slots that enable some variability of the connection between the vehicle engaging member 16 and the vehicle body 14, i.e. depending on the specific shape of the vehicle body 14. In some such embodiments, the first coupling apertures 30 can be between approximately 0.55 inches and 0.65 inches in length, and between approximately 0.25 inches and 0.30 inches in width. Alternatively, the first coupling apertures 30 can have a different size and/or a different design (e.g., circular). Still alternatively, the first coupling apertures 30, e.g., slot-shaped apertures, can be oriented in any suitable manner.

The shape and dimensions of the first coupling section 22 can be varied. For example, in some embodiments, the first coupling section 22 can be substantially rectangle-shaped, with a length (from front-to-back until it transitions into the transitional section 26)) of between approximately 1.25 inches and 1.75 inches, and a width (from side-to-side) of between approximately 1.75 inches and 2.25 inches. Alternatively, the dimensions of the first coupling section 22 can be greater than or less than those specifically noted above.

As shown in this embodiment, the second coupling section 24 extends upwardly at an angle, e.g., between approximately 115 degrees and 145 degrees, from the supporting section 28. Additionally, as noted above, the second coupling section 24 includes the pair of second coupling apertures 34 that are configured to receive the second fasteners 36 (illustrated in FIG. 1A) to provide another portion of the coupling between the vehicle engaging member 16 and the vehicle body 14. In some embodiments, the second coupling apertures 34 can comprise slots that enable some variability of the connection between the vehicle engaging member 16 and the vehicle body 14, i.e. depending on the specific shape of the vehicle body 14. As shown, the second coupling apertures 34 can be formed in an angled, winged portion 256 of the second coupling section 24 that extends in a generally outwardly extending direction. In some such embodiments, the second coupling apertures 30 can be between approximately 0.75 inches and 1.00 inches in length, and between approximately 0.25 inches and 0.30 inches in width. Alternatively, the second coupling apertures 34 can have a different design (e.g., circular) and/or be positioned in a different manner. Still alternatively, the second coupling apertures 34, e.g., slot-shaped apertures, can be oriented in any suitable manner.

Further, as shown, the second coupling section 24 can also include an additional aperture 258 that can be further utilized in securing the vehicle engaging member 16 to the vehicle body 14. As shown, the additional aperture 258 can be generally circular in shape and can be formed in a cantilevering portion 260 that extends generally upwardly away from the winged portion 256. Alternatively, the additional aperture 258 can have a different design and/or be positioned in a different manner. Still alternatively, the second coupling section 24 can be designed without the additional aperture 258.

Additionally, in some embodiments, the second coupling section 24 can have an overall length (from the supporting section 28 to the tip of the cantilevering portion 260) of between approximately 2.50 inches and 3.00 inches, and an overall width (from tip-to-tip of the winged portion 256) of between approximately 5.00 inches and 6.00 inches. Alternatively, the dimensions of the second coupling section 24 can be greater than or less than those specifically noted above.

As shown, the transitional section 26 extends in a substantially vertical direction between the first coupling section 22 and the supporting section 28. In some embodiments, the transitional section 26 be substantially rectangle-shaped and can have a length (from the first coupling section 22 to the supporting section 28) of between approximately 4.50 inches and 5.50 inches, and a width (from side-to-side) of between approximately 1.75 inches and 2.25 inches. Alternatively, the dimensions of the transitional section 26 can be greater than or less than those specifically noted above.

The supporting section 28, as noted above, is configured to adjustably support the seat back receiving member 18 (illustrated in FIG. 1A). As shown, the supporting section 28 extends in a generally horizontal direction between the transitional section 26 and the second coupling section 24. For example, in certain non-exclusive embodiments, the supporting section 28 can extend away from the transitional section 26 at an angle of between approximately eighty-two degrees and ninety degrees.

Additionally, as shown, the supporting section 28 can be substantially rectangle-shaped having a length (from the transitional section 26 to the second supporting section 24) of between approximately 2.50 inches and 3.50 inches, and a width (from side-to-side) of between approximately 2.75 inches and 3.75 inches. Alternatively, the dimensions of the supporting section 28 can be greater than or less than those specifically noted above.

Further, as illustrated in this embodiment, the supporting section 28 includes a plurality of support apertures 246 for receiving the base fasteners 44 (illustrated in FIG. 1A) usable for coupling the seat back receiving member 18 to the vehicle engaging member 16. In various embodiments, the supporting section 28 can include four support apertures 246 that are formed as slots having a length of between approximately 0.75 inches and 1.25 inches, and a width of between approximately 0.25 inches and 0.30 inches. The slotted design of the support apertures 246 enables the vehicle engaging member 16 to support the seat back receiving member 18 in alternative horizontal positions. For example, as shown in FIG. 2B, the base fasteners 44 can be alternatively received by the support apertures 246 (i) in a first horizontal position 244A (illustrated by solid circles) such that the seat back receiving member 18, and thus the seat back 20, will be positioned in a first, forward-most position relative to the vehicle seat 15 (illustrated in FIG. 1A); (ii) in a second horizontal position 244B (illustrated by dashed circles) such that the seat back receiving member 18, and thus the seat back 20, will be positioned in a second, intermediate position relative to the vehicle seat 15; and (iii) in a third horizontal position 244C (illustrated by dotted circles) such that the seat back receiving member 18, and thus the seat back 20, will be positioned in a third, rearward-most position relative to the vehicle seat 15. It should be appreciated that the base fasteners 44 can be positioned anywhere within the support apertures 246 along the continuum between the first horizontal position 244A and the third horizontal position 244C. Alternatively, the support apertures 246 can have a different design (e.g., circular) and/or be positioned in a different manner. Still alternatively, the support apertures 246, e.g., the slots, can be oriented in any suitable manner.

Additionally, it should be appreciated that the use of the terms "first horizontal position", "second horizontal position" and "third horizontal position", is merely for convenience and ease of illustration. Thus, any of the horizontal positions 244A, 244B, 244C can be referred to as the "first horizontal position", the "second horizontal position" and/or the "third horizontal position".

Figure 3:
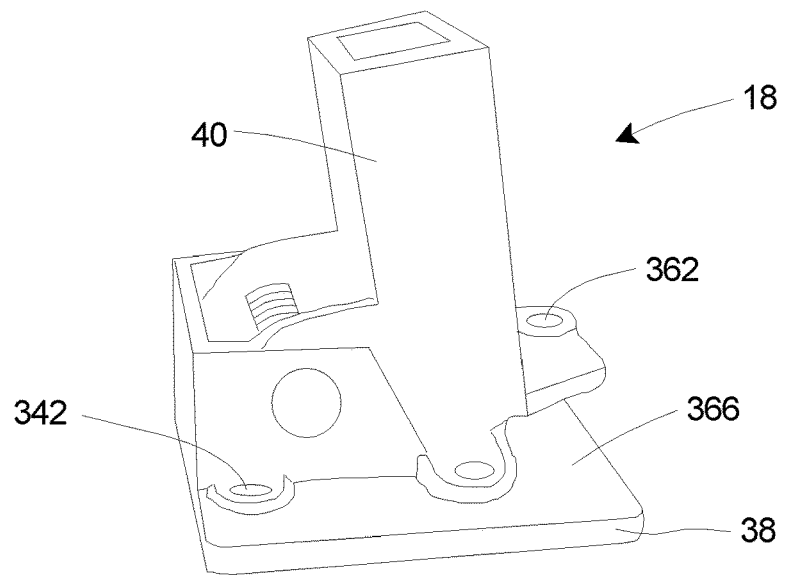
FIG. 3 is a side perspective view of an embodiment of a seat back receiving member that forms a portion of the seat back support assembly illustrated in FIG. 1A.

FIG. 3 is a side perspective view of the seat back receiving member 18 that forms a portion of the seat back support assembly 12 illustrated in FIG. 1A. As described above, and as illustrated in FIG. 3, the seat back receiving member 18 includes the base 38 and the post receiving member 40 that is movably coupled to the base 38. Additionally, as provided herein, the seat back receiving member 18 is configured to be adjustably coupled (both vertically and horizontally) to the vehicle engaging member 16 (illustrated in FIG. 1A).

The base 38 includes the plurality of base apertures 342 that are each configured to receive one of the base fasteners 44 (illustrated in FIG. 1A) for purposes of coupling the seat back receiving member 18 to the supporting section 28 (illustrated in FIG. 1A) of the vehicle engaging member 16. As provided above, each of the base fasteners 44 can be configured to extend through one of the base apertures 342 as well as through one of the support apertures 246 (illustrated, for example, in FIG. 2B) formed in the supporting section 28 of the vehicle engaging member 16. In different embodiments, the base apertures 342 can be substantially circular or the base apertures 342 can be slot-shaped to add even further variability to the adjustability of the seat back receiving member 18 relative to the vehicle engaging member 16. Moreover, it should also be appreciated that in embodiments where the base apertures 342 are slot-shaped, the based apertures 342 can be oriented in any direction.

As noted above, with the design of the vehicle engaging member 16 and/or the seat back receiving member 18 as illustrated and describe in detail herein, the horizontal position of the seat back 20 relative to the vehicle seat 15 (illustrated in FIG. 1A) is selectively adjustable by adjusting the position of the seat back receiving member 18 relative to the vehicle engaging member 16. Such adjustment does not require any adjustment of the coupling between the seat back 20 and the seat back support assembly 12.

Additionally, as noted, the post receiving member 40 is configured to receive the support post 50 (illustrated in FIG. 1B) of the seat back 20 (illustrated in FIG. 1B) for purposes of coupling the seat back 20 to the seat back receiving member 18.

Further, the post receiving member 40 also includes an adjuster aperture 362 to receive an angle adjuster 464 (illustrated in FIG. 4A), e.g., a screw or bolt, so that an angular position of the post receiving member 40 relative to the base 38 can be selectively adjusted. More particularly, the angle adjuster 464 can be threaded through the adjuster aperture 362 until the angle adjuster 464 contacts an upper surface 366 of the base 38. By continuing to thread the angle adjuster 464 into or out of the adjuster aperture 362, the angle of the post receiving member 40 relative to the base 38 can be selectively adjusted as desired. Stated in another manner, by rotating the angle adjuster 464 relative to the adjuster aperture 362, the angular position of the post receiving member 40 relative to the base 38 can be selectively adjusted between a first angular position and a second angular position, and anywhere in between. The angular movement of the post receiving member 40 relative to the base 38 is illustrated with arrow 468 shown in FIG. 4A.

Figure 4A:
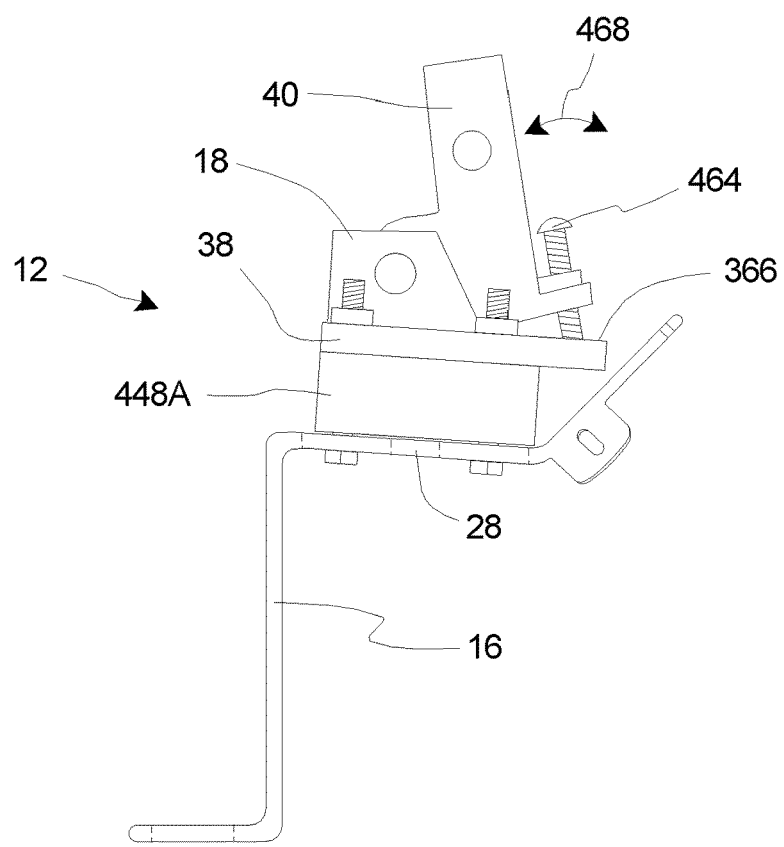
FIG. 4A is a side view of the seat back support assembly illustrated in FIG. 1A, the seat back support assembly including a first vertical support member so that the seat back is positioned at a first height.

FIG. 4A is a side view of the seat back support assembly 12 illustrated in FIG. 1A. As shown, the seat back support assembly 12 includes a first vertical support member 448A having a first thickness so that the seat back 20 (illustrated in FIG. 1B) is positioned at a first height relative to the vehicle seat 15 (illustrated in FIG. 1A). More specifically, by positioning and coupling the first vertical support member 448A between the base 38 of the seat back receiving member 18 and the supporting section 28 of the vehicle engaging member 16, the seat back receiving member 18 is positioned at a higher vertical position than if no vertical support member was used. Thus, the seat back 20 when it is coupled to the seat back receiving member 18 can be positioned at the first height relative to the vehicle seat 15.

It should be appreciated that in order to effectively secure the first vertical support member 448A between the base 38 of the seat back receiving member 18 and the supporting section 28 of the vehicle engaging member 16, with the base fasteners 44 extending through the base apertures 342 (illustrated in FIG. 3) and the support apertures 246 (illustrated in FIG. 2B), the first vertical support member 448A can also include a plurality of first member apertures (not shown). Additionally, it should be appreciated that the first member apertures can be substantially circular in shaped, slot-shaped, or some other shape.

The first vertical support member 448A can have any suitable design. For example, in some embodiments, the first vertical support member 448A is substantially rectangular block-shaped. Alternatively, the first vertical support member 448A can have another suitable design and/or be formed in another suitable shape. For example, in one non-exclusive alternative embodiment, the first vertical support member 448A can be substantially triangular block-shaped. With such alternative design, the first vertical support member 448A can provide angular adjustment of the seat back receiving member 18 relative to the vehicle engaging member 16, in addition to the noted adjustment of the vertical position of the seat back receiving member 18 relative to the vehicle engaging member 16.

Further, the first vertical support member 448A can be formed from any suitable materials. For example, the first vertical support member 448A can be formed from iron, steel, carbon fiber, or any other suitably strong and rigid materials.

Additionally, as noted above, FIG. 4A also illustrates the angle adjuster 464 that extends through the adjuster aperture 362 (illustrated in FIG. 3) to contact the upper surface 366 of the base, so as to enable the angular adjustment of the post receiving member 40 as indicated by arrow 468.

Figure 4B:
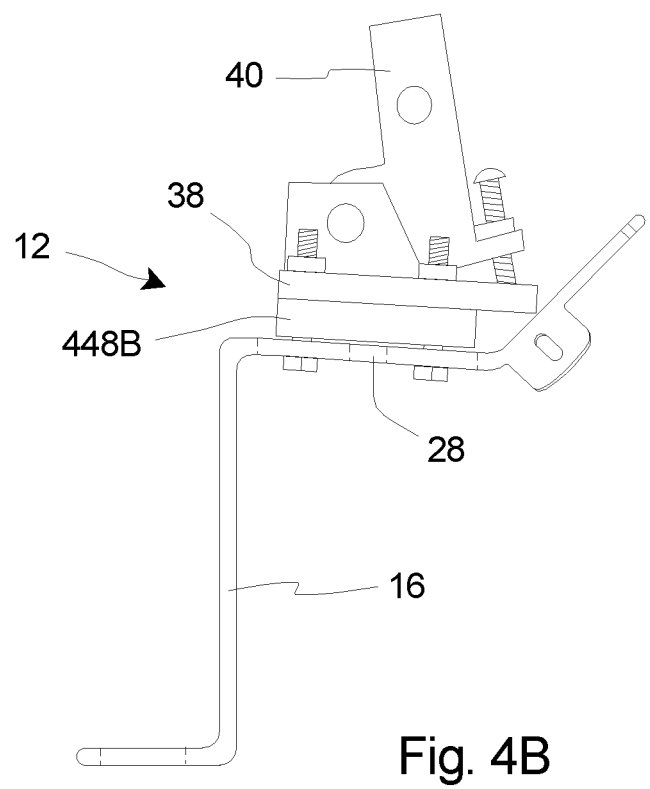
FIG. 4B is another side view of the seat back support assembly illustrated in FIG. 1A, the seat back support assembly including a second vertical support member so that the seat back is positioned at a second height.

FIG. 4B is another side view of the seat back support assembly 12 illustrated in FIG. 1A. As shown, the seat back support assembly 12 includes a second vertical support member 448B having a second thickness that is different than (e.g., less than) the first thickness so that the seat back 20 (illustrated in FIG. 1B) is positioned at a second height relative to the vehicle seat 15 (illustrated in FIG. 1A). More specifically, by positioning and coupling the second vertical support member 448B between the base 38 of the seat back receiving member 18 and the supporting section 28 of the vehicle engaging member 16, the seat back receiving member 18 can be positioned at a higher vertical position than if no vertical support member was used, but at a lower vertical position than if the first vertical support member 448A (illustrated in FIG. 4A) was used. Thus, the seat back 20 when it is coupled to the seat back receiving member 18 can be positioned at the second height relative to the vehicle seat 15.

It should be appreciated that in order to effectively secure the second vertical support member 448B between the base 38 of the seat back receiving member 18 and the supporting section 28 of the vehicle engaging member 16, with the base fasteners 44 extending through the base apertures 342 (illustrated in FIG. 3) and the support apertures 246 (illustrated in FIG. 2B), the second vertical support member 448B can also include a plurality of second member apertures (not shown). Additionally, it should be appreciated that the second member apertures can be substantially circular in shaped, slot-shaped, or some other shape.

The second vertical support member 448B can have any suitable design. For example, in some embodiments, the second vertical support member 448B is substantially rectangular block-shaped. Alternatively, the second vertical support member 448B can have another suitable design and/or be formed in another suitable shape. For example, as above, in one non-exclusive alternative embodiment, the second vertical support member 448B can be substantially triangular block-shaped. In such embodiments, the second vertical support member 448B can provide angular adjustment of the seat back receiving member 18 relative to the vehicle engaging member 16, in addition to the noted adjustment of the vertical position of the seat back receiving member 18 relative to the vehicle engaging member 16.

Further, the second vertical support member 448B can be formed from any suitable materials. For example, the second vertical support member 448B can be formed from iron, steel, carbon fiber, or any other suitably strong and rigid materials.

Figure 4C:
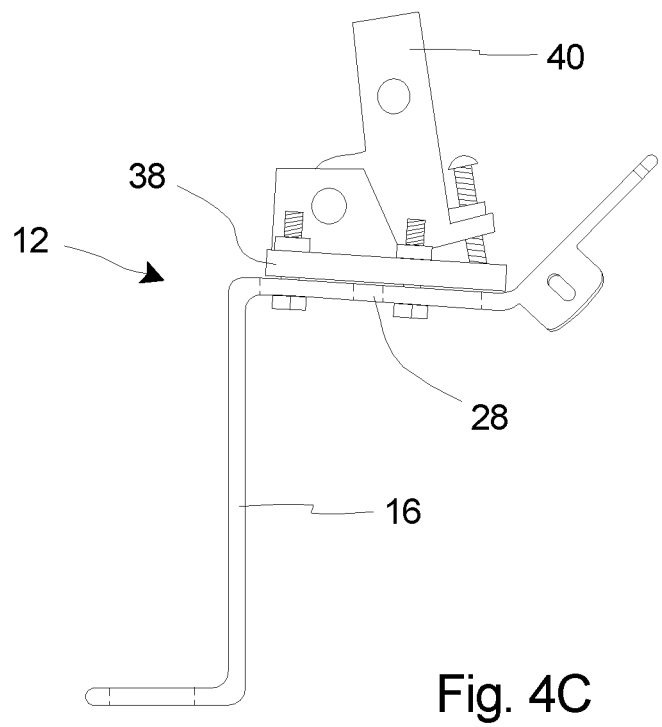
FIG. 4C is still another side view of the seat back support assembly illustrated in FIG. 1A, the seat back support assembly having no vertical support member so that the seat back is positioned at a third height.

FIG. 4C is still another side view of the seat back support assembly 12 illustrated in FIG. 1A. As shown in FIG. 4C, the seat back support assembly 12 has no vertical support member so that the seat back 20 (illustrated in FIG. 1B) is positioned at a third height relative to the vehicle seat 15 (illustrated in FIG. 1A). More particularly, in this configuration, i.e. with no vertical support member, the base 38 of the seat back receiving member 18 is substantially directly coupled to the supporting section 28 of the vehicle engaging member 16 such that the seat back receiving member 18 can be positioned at a lower vertical position than if any of the vertical support members are used. Thus, the seat back 20 when it is coupled to the seat back receiving member 18 can be positioned at the third height relative to the vehicle seat 15.

It should be appreciated that any number of alternative vertical support members can be utilized to vary the height of the seat back 20 as desired relative to the vehicle seat 15 provided the base fasteners 44 are of sufficient length.

As noted above, with the use of such alternative vertical support members 448A, 448B or no vertical support member, the vertical position of the seat back 20 relative to the vehicle seat 15 is selectively adjustable by enabling the selective adjustment of the position of the seat back receiving member 18 relative to the vehicle engaging member 16. Additionally, such adjustment does not require any adjustment of the coupling between the seat back 20 and the seat back support assembly 12.

Further, it should be appreciated that the use of the terms "first vertical support member" and "second vertical support member", is merely for convenience and ease of illustration. Thus, either of the vertical support members 448A, 448B can be referred to as the "first vertical support member" and/or the "second vertical support member". Moreover, the references to the "first thickness" and the "second thickness", as well as the references to the "first height", the "second height" and the "third height", can also be used interchangeably.

Figure 5:
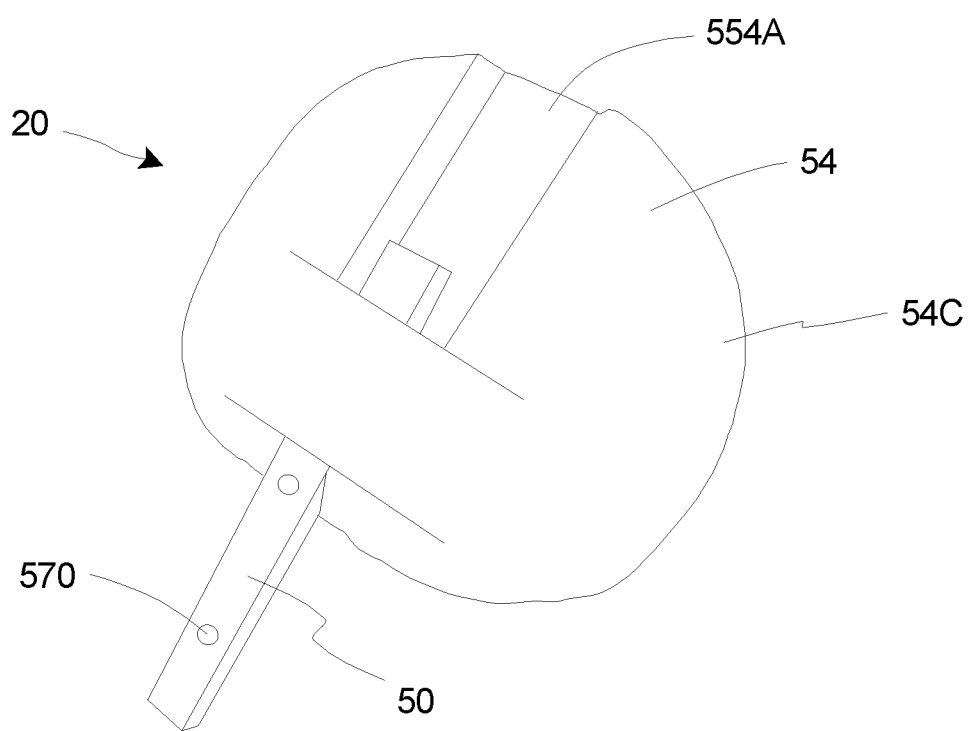
FIG. 5 is a rear perspective view of the seat back illustrated in FIG. 1B.

FIG. 5 is a rear perspective view of the seat back 20 illustrated in FIG. 1B. In particular, FIG. 5 illustrates a rear perspective view of the support post 50 and the back cushion assembly 54 of the seat back 20.

As shown in FIG. 5, the support post 50 includes one or more post apertures 570. The post apertures 570 can be aligned with corresponding post receiver apertures (not shown) in the post receiving member 40 (illustrated in FIG. 1A) such that each receive a single seat back fastener (not shown) for purposes of coupling the seat back 20 to the seat back receiving member 18 (illustrated in FIG. 1A). Alternatively, the seat back 20 can be coupled to the seat back receiving member 18 in a different manner.

It is understood that although a number of different embodiments of the seat back support assembly 12 have been illustrated and described herein, one or more features of any one embodiment can be combined with one or more features of one or more of the other embodiments, provided that such combination satisfies the intent of the present invention.

While a number of exemplary aspects and embodiments of the seat back support assembly 12 have been shown and disclosed herein above, those of skill in the art will recognize certain modifications, permutations, additions and sub-combinations thereof. It is therefore intended that the seat back support assembly 12 shall be interpreted to include all such modifications, permutations, additions and sub-combinations as are within their true spirit and scope, and no limitations are intended to the details of construction or design herein shown.

What is claimed is:

1. A method for adjustably supporting a seat back of a vehicle, the vehicle including a vehicle body and a vehicle seat, the method comprising:
   securing a vehicle engaging member to the vehicle body, the vehicle engaging member including a supporting section; and
   adjustably coupling a seat back receiving member to the vehicle engaging member, the seat back receiving member including (i) a base that is adjustably coupled to the supporting section of the vehicle engaging member, the base being alternatively positioned in a first vertical position and a second vertical position relative to the supporting section, the second vertical position being different than the first vertical position; and (ii) a receiver that is coupled to the base, the receiver being configured to receive the seat back;
   wherein when the base is in the first vertical position, the seat back is at a first height relative to the vehicle seat; and
   wherein when the base is in the second vertical position, the seat back is at a second height relative to the vehicle seat that is different than the first height.

2. The method of claim 1 further comprising alternatively coupling a first vertical support member to the vehicle engaging member substantially between the base and the supporting section so that the base is alternatively positioned in the first vertical position relative to the supporting section, the first vertical support member having a first thickness, the first vertical support member supporting the seat back receiving member so that the seat back is positioned at the first height relative to the vehicle seat; and wherein when the base is alternatively positioned in the second vertical position relative to the supporting section, the method includes substantially directly coupling the base to the supporting section so that the seat back is positioned at the second height relative to the vehicle seat.

3. The method of claim 1 wherein adjustably coupling includes the base being alternatively positioned in a third vertical position relative to the supporting section, the third vertical position being different than the first vertical position and the second vertical position; and wherein when the base is in the third vertical position, the seat back is at a third height relative to the vehicle seat that is different than the first height and the second height.

4. The method of claim 3 further comprising (i) alternatively coupling a first vertical support member to the vehicle engaging member substantially between the base and the supporting section so that the base is alternatively positioned in the first vertical position relative to the supporting section, the first vertical support member having a first thickness, the first vertical support member supporting the seat back receiving member so that the seat back is positioned at the first height relative to the vehicle seat; and (ii) alternatively coupling a second vertical support member to the vehicle engaging member substantially between the base and the supporting section so that the base is alternatively positioned in the second vertical position relative to the supporting section, the second vertical support member having a second thickness that is different than the first thickness, the second vertical support member supporting the seat back receiving member so that the seat back is positioned at the second height relative to the vehicle seat; and wherein when the base is alternatively positioned in the third vertical position relative to the supporting section, the method includes substantially directly coupling the base to the supporting section so that the seat back is positioned at the third height relative to the vehicle seat.

5. The method of claim 1 wherein adjustably coupling further includes the base being alternatively positioned in a first horizontal position and a second horizontal position relative to the supporting section, the second horizontal position being different than the first horizontal position; wherein when the base is in the first horizontal position, the seat back is in a first position relative to the vehicle seat; and wherein when the base is in the second horizontal position, the seat back is in a second position relative to the vehicle seat that is different than the first position.

6. The method of claim 5 wherein securing includes the supporting section having a support aperture; wherein adjustably coupling includes the base having a base aperture; and wherein adjustably coupling further includes extending a base fastener through the support aperture and the base aperture to adjustably couple the base to the support section, at least one of the support aperture and the base aperture being substantially slot-shaped.

7. The method of claim 5 wherein securing includes the supporting section having a plurality of support apertures; wherein adjustably coupling includes the base having a plurality of base apertures; and wherein adjustably coupling further includes extending each of a plurality of base fasteners through one of the plurality of support apertures and one of the plurality of base apertures to adjustably couple the base to the support section, each of the plurality of support apertures being substantially slot-shaped.

8. The method of claim 5 wherein adjustably coupling includes the base being alternatively positioned in a third horizontal position relative to the supporting section, the third horizontal position being different than the first horizontal position and the second horizontal position; and wherein when the base is in the third horizontal position, the seat back is in a third position relative to the vehicle seat that is different than the first position and the second position.

9. The method of claim 1 wherein adjustably coupling includes movably coupling a receiver of the seat back receiving member to the base, the receiver including a receiver aperture that is configured to receive a portion of the seat back; and selectively adjusting an angle of the receiver aperture relative to the base to selectively adjust a seat back angle of the seat back relative to the vehicle seat.

10. The method of claim 9 wherein movably coupling the receiver includes biasing an angular position of the receiver with a resilient member of the seat back receiving member so as to maintain the seat back angle of the seat back relative to the vehicle seat.

11. The method of claim 1 wherein securing includes alternatively securing the vehicle engaging member to the vehicle body in multiple locations.

12. A method for adjustably supporting a seat back of a vehicle, the vehicle including a vehicle body and a vehicle seat, the method comprising:

securing a vehicle engaging member to the vehicle body, the vehicle engaging member including a supporting section; and adjustably coupling a seat back receiving member to the vehicle engaging member, the seat back receiving member including a base that is adjustably coupled to the supporting section of the vehicle engaging member, the base being alternatively positioned in a first horizontal position and a second horizontal position relative to the supporting section, the second horizontal position being different than the first horizontal position;

wherein when the base is in the first horizontal position, the seat back is in a first position relative to the vehicle seat; and wherein when the base is in the second horizontal position, the seat back is in a second position relative to the vehicle seat that is different than the first position.

13. The method of claim 12 wherein securing includes the supporting section having a support aperture; wherein adjustably coupling includes the base having a base aperture; and wherein adjustably coupling further includes extending a base fastener through the support aperture and the base aperture to adjustably couple the base to the support section, at least one of the support aperture and the base aperture being substantially slot-shaped.

14. The method of claim 12 wherein adjustably coupling includes the base being alternatively positioned in a third horizontal position relative to the supporting section, the third horizontal position being different than the first horizontal position and the second horizontal position; and wherein when the base is in the third horizontal position, the seat back is in a third position relative to the vehicle seat that is different than the first position and the second position.

15. The method of claim 12 wherein adjustably coupling includes movably coupling a receiver of the seat back receiving member to the base, the receiver including a receiver aperture that is configured to receive a portion of the seat back; and selectively adjusting an angle of the receiver aperture relative to the base to selectively adjust a seat back angle of the seat back relative to the vehicle seat.

16. The method of claim 15 wherein movably coupling the receiver includes biasing an angular position of the receiver with a resilient member of the seat back receiving member so as to maintain the seat back angle of the seat back relative to the vehicle seat.

17. The method of claim 12 wherein securing includes the supporting section having a plurality of support apertures; wherein adjustably coupling includes the base having a plurality of base apertures; and wherein adjustably coupling further includes extending each of a plurality of base fasteners through one of the plurality of support apertures and one of the plurality of base apertures to adjustably couple the base to the support section, each of the plurality of support apertures being substantially slot-shaped.

18. The method of claim 12 wherein securing includes alternatively securing the vehicle engaging member to the vehicle body in multiple locations.

19. A method for adjustably supporting a seat back of a vehicle, the vehicle including a vehicle body and a vehicle seat, the method comprising:

securing a vehicle engaging member to the vehicle body, the vehicle engaging member including a supporting section having a support aperture;

adjustably coupling a seat back receiving member to the vehicle engaging member, the seat back receiving member including (i) a base that is adjustably coupled to the supporting section of the vehicle engaging member, the base including a base aperture, and (ii) a receiver that is movably coupled to the base, the receiver including a receiver aperture that is configured to receive a portion of the seat back;

selectively adjusting an angle of the receiver aperture relative to the base to selectively adjust a seat back angle of the seat back relative to the vehicle seat;

alternatively coupling a first vertical support member to the vehicle engaging member substantially between the base and the supporting section so that the base is alternatively positioned in a first vertical position and a second vertical position relative to the supporting section, the second vertical position being different than the first vertical position, the first vertical support member having a first thickness; and extending a base fastener through the support aperture and the base aperture to adjustably couple the base to the support section so that the base is alternatively positioned in a first horizontal position and a second horizontal position relative to the supporting section, the second horizontal position being different than the first horizontal position, at least one of the support aperture and the base aperture being substantially slot-shaped;

wherein when the first vertical support member is positioned substantially between the base and the supporting section, the first vertical support member supports the seat back receiving member so that the base is positioned in the first vertical position and the seat back is positioned at a first height relative to the vehicle seat;

wherein when the first vertical support member is not positioned between the base and the supporting section, the base is substantially directly coupled to the supporting section so that the base is in the second vertical position and the seat back is at a second height relative to the vehicle seat that is different than the first height;

wherein when the base is in the first horizontal position, the seat back is in a first position relative to the vehicle seat; and wherein when the base is in the second horizontal position, the seat back is in a second position relative to the vehicle seat that is different than the first position.

20. The method of claim 19 further comprising alternatively coupling a second vertical support member to the vehicle engaging member substantially between the base and the supporting section so that the base is alternatively positioned in a third vertical position relative to the supporting section, the third vertical position being different than the first vertical position and the second vertical position, the second vertical support member having a second thickness that is different than the first thickness, the second vertical support member supporting the seat back receiving member so that the seat back is positioned at a third height relative to the vehicle seat that is different than the first height and the second height.

* * * * *